March 3, 1970     L. S. VARGO     3,498,656

LOOP AND KNOT MAKING DEVICE

Filed Sept. 11, 1968

*Louis S. Vargo*
INVENTOR.

BY
*Thomas E. Sterling*

_United States Patent Office_

3,498,656
Patented Mar. 3, 1970

3,498,656
LOOP AND KNOT MAKING DEVICE
Louis S. Vargo, 529 Railroad St.,
Windber, Pa. 15963
Filed Sept. 11, 1968, Ser. No. 759,179
Int. Cl. D03j 3/00
U.S. Cl. 289—17   9 Claims

ABSTRACT OF THE DISCLOSURE

This invention is a multiple purpose device, one end of which is designed to grasp a fishhook or fishing fly in a manner to prevent the barb impaled on the hand or fingers, a line holding member designed to grasp the line to be tied. The other coacting end of the device is comprised of a clamping device by which line may be held in preparation for the tying of loop or knots in a line. More specifically, the device is comprised of an elongated U-shaped support member having a center section bent over so as to form a box, the upper portion of which has slots therein for the reception of varying sizes of fishhooks, a plastic line holding member mounted on the end portion of said support member, a hook clamping slide positioned upon said support member and biased towards said slots, a loop tying slide having a line slot therein, said slot positioned within said support member and having a coacting bias with said hook slide.

---

This invention relates to devices to assist in the making of loops and knots and more particularly to devices designed to aid the fisherman in tying fish line to fishhooks The problems connected with the tying of fish line upon fishhooks become greater as the size of the fishhook becomes smaller, especially when such small fishhooks are utilized on fishing flies as lures. Fishermen frequently find that difficulty in tying fish line on to said flies or fishhooks, especially under fishing conditions where the line, hook and fingers may be wet and cold. Likewise, difficulty is often encountered in tying or looping fish line under these adverse conditions. There is always danger present of impaling the fishhook barbs in the fingers or damaging and distorting the fishing flies in connection with tying or looping the fishline. The present invention solves many of these problems by providing a simple, easy to use device for the fisherman to assist him in tying knots in fish line and tying fish line to hooks.

It is therefore an object of this invention to provide a device for safely holding a fishhook and the fish line to be connected thereto so that the line may be conveniently tied to the fishhook.

It is another object of this invention to provide a device whereby fish line may be easily looped in preparation for the tying of a fisherman's knot or other knots.

It is still another object of this invention to provide a compact, easily disassembled device which can be conveniently carried by the fisherman in the field.

It is yet another object of this invention to provide an easily repaired device.

It is still another object of this invention to provide a completely safe and simple fishhook and line tying device that may be used conveniently by children, the elderly and in cases, the handicapped.

It is yet another object of this invention to provide a holding device for fishing flies whereby the fly may be conveniently dressed or repaired.

It is another object of this invention to provide a device whereby fishing lines may be conveniently held during mending.

Other objects and a fuller understanding of the invention may be had by referring to the following description and claims, taken in conjunction with the accompanying drawing in which:

Figure 1:
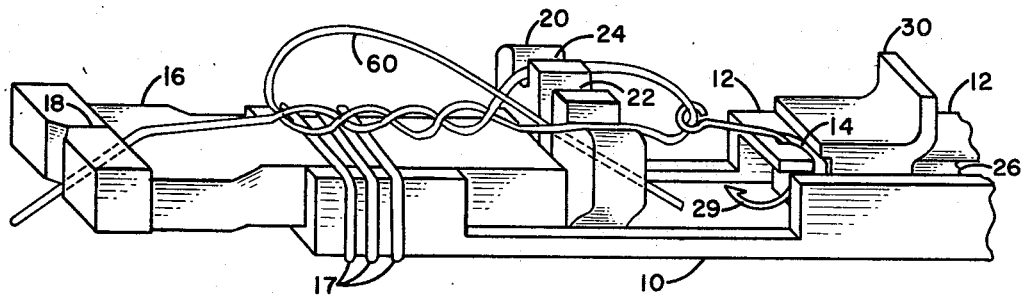
FIGURE 1 is a plan view of the invention showing the hook tying portion of the device.
Figure 5:
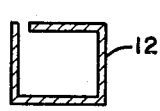
FIGURE 5 is a fragmented cross sectional view taken along line 5—5 of FIGURE 3.
Figure 4:
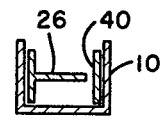
FIGURE 4 is a fragmented cross sectional view taken along line 4—4 of FIGURE 3 showing the device in its assembled condition.
Figure 3:
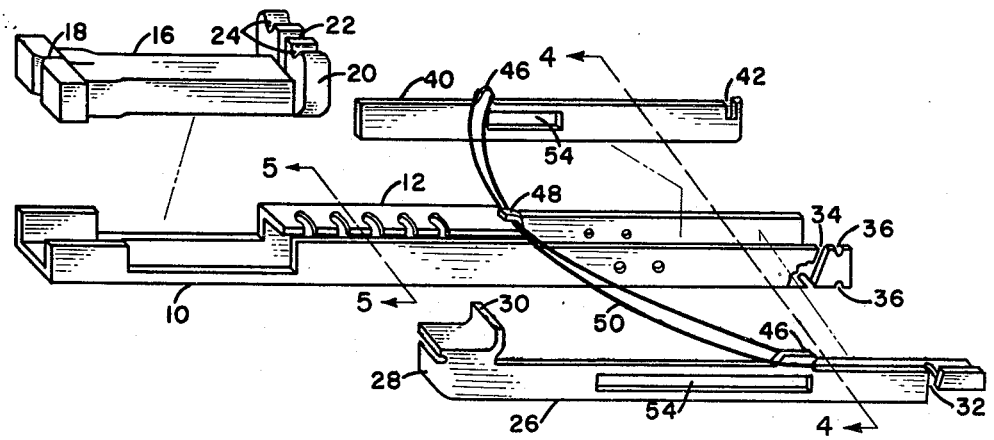
FIGURE 3 is an exploded view of the invention showing integral parts.
Figure 2:
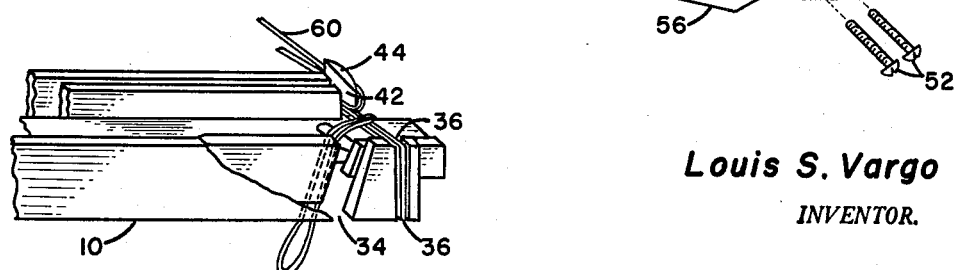
FIGURE 2 is a plan view of the invention showing the loop making portion of the device.

Referring now to the drawings, 10 represents a U-shaped elongated support member 10 having a boxed-shaped center section 12. The upper portion of said center section 12 has a series of angular slots 14 therethrough to accommodate varying sizes of fishhooks. A plastic line holding member 16 is positioned in said U-shaped support member 10 adjacent to said center section 12. Line holding member 16 is secured to support member 10 by means of elastic 17 which is wrapped about both the support member 10 in line holding member 16. In practice, line holding member 16 is constructed of compressible rubber although other plastics may be used. Line holding member 16 has a line securing slit 18 therein in which fish line is inserted and retained. The end portion of line holding member 16 closest to angular slot 14 has an elevated flange 20 upon which is located a line retaining slot 22 and two line positioning grooves 24 on either side of the line retaining slot 22.

Holding member 16 was so designed that its position can be varied should the shank of hook 29 be extra long or if more room is needed between the eye of the hook 29 and the back portion of holding member 16. This extra room may be needed in the making of certain personally designed knots. The fit between the support member 10 and holding member 16 is such that it requires some force to position holding member 16 within support member 10. The elastic 17 assists in maintaining the position of holding member 16. Elastic 17 may be used to replace rubber band 50 (later described) should rubber band 50 rupture in the field.

An elongated hook clamping slide 26 is slideably positioned within said support member 10 with one end portion extending to angular slots 14 and the other end portion to the end of support member 10. The end portion of hook clamping slide 26 adjacent to the angular slots 14 has a bifurcated head 28 which is positioned on either side of angular slot 14 to clamp the fishhook 29 inserted in the angular slots 14. The upper portion of bifurcated head 28 has an elevated thumb control 30 thereon whereby hook clamping slide 26 may be slid toward or away from slots 14. The other end portion of hook clamping slide 26 has an angular loop making slot 32 laterally positioned therein. Loop making slot 32 may be aligned with a mating slot 34 through the lateral end portion of support member 10 so that a fish line may be slipped through mating slot 34 and into loop making slot 32. Two line retaining notches 36 are positioned on the end portion of support member 10, adjacent to mating slot 34.

A loop making slide 40 is slideably attached within the U-shaped portion of support member 10 and extends longitudinally therein. Loop making slide 40 has a line retaining slot 42 and vice 44 positioned on the end portion loop making slide 40 whereby line may be placed within the line retaining slot and clamped against the end portion of support member 10 by vice 44. The central portions of both loop making slide 40 and hook clamping slide 26 have elevated rubber band retaining posts 46 positioned on the upper portion thereof. The adjacent end portion of center section 12 likewise has a rubber retaining hook 48 extending upwardly therefrom. The end portion of a rubber band 50 is hooked upon the rubber band retaining post 46 and looped about band retaining hook 48 so as to bias both loop making slide 40 and hook clamping slide 26 towards angular slots 14.

The device is held together by means of two screws 52 extending through the lateral portion support member 10, longitudinal holes 54 in both loop making slide 40 and hook clamping slide 26 and anchoring in the other lateral portion of support member 10. A pocket clip 56 is retained on the side of support member 10 by screws 52 enabling the device to be clamped upon a fisherman's pocket.

The operation of the knot making device is as follows:

The hook clamping slide 26 is pushed outwardly by means of thumb control 30 exposing angular slots 14 on the center section 12 and fishhook 29 inserted in slots 14 with its point pointed down and contained within the center section 12. An appropriate slot 14 is selected depending upon the size of the fishhook 29. Hook clamping slide 26 is then released causing bifurcated head 28 to press against fishhook 29 retaining it securely in slots 14. The eye of fishhook 29 is then exposed adjacent to the line holding member 16. The eye of the fishhook 29 is then threaded with a fish line 60 and the line placed in line positioned groove 24 and held taut. The device is then rotated in the fingers making three or four complete turns of the line 60 and then the long portion of the line 60 placed in line securing slit 18, and the short end portion put through the line retaining slot 22 and squeezed with the thumb and forefinger to hold the line securely. The line may be lifted out of the line securing slit 18. This will alow it to come free of the line positioning groove 24 and the knot completely by drawing the line tight while still pressing on the slides of line retaining slot 22.

The loop making portion of this invention operates in the following manner:

Loop making slide 40 is pressed outwardly exposing line retaining slots 42 and vice 44. A preformed loop of line 60 is then placed in line retaining slot 42 and vice 44 and loop retaining slide 40 released so that the line is held securely because of the biasing action of the rubber band 50. Hook clamping slide 26 is then pressed outwardly by means of thumb control 30 against the bias rubber band 50 until angular loop making slot 32 is aligned with mating slot 34. The loop line 60 is then wrapped about support member 10 over line retaining notches 36 and placed in loop making slot 32, so as to form a loop about the end portion of support member 10. Hook clamping slide 26 is then pressed outwardly pulling the looped line 60 through itself until the loop is drawn through. The loop is then released from the device and tightened forming a fish knot.

In addition to the knot and loop making portion of the device, as described, the knot making device may also be used to form or repair fishing fly lures. To do this the hook portion of the fishing fly is clamped in slots 14 as previously described and the fly then conveniently repaired without danger of impaling the barb of the fishhook in the fingers or hand. In addition, the vice action of the various points of the device may be used for clamping fish lines as in mending, etc.

The interior portion of the support member 10 is used to carry extra rubber bands which may be used in the event that rubber band 50 or elastic 17 rupture while in the field. In emergency the fish line or other similar tying cord may be used, in place of the elastic 17 or rubber band 50.

Although we have described this invention with a certain degree of particularity. It is understood that the present disclosure has been made by way of example only and that numerous changes in the details of construction and the combination and arrangements of parts may be resorted to without departing from the spirit and the scope of the invention.

What is claimed is:

1. A hook tying device comprising in combination:
   a support member;
   a center section integrally attached to said support member, said center section having a hook securing slot therein for the retention of a hook;
   an elastic line holding member having a line retaining slot therein, said line holding member positioned upon said support member adjacent to said center section;
   a hook clamping slide, slideably attached to said support member and adapted to slide to said hook securing slot;
   bias means attached to said hook clamping slide adapted to bias said hook clamping slide towards said hook securing slot.

2. The combination as claimed in claim 1 in which said bias means is comprised of an elastic band attached to said hook clamping slide and to said center section.

3. The combination as claimed in claim 2 in which said line holding member has a line retaining slit therein for the retention of lines.

4. The combination as claimed in claim 3 in which said hook clamping slide has a bifurcated head thereon adapted to pass on either side of said hook securing slot.

5. The combination as claimed in claim 4 having a loop making device integrally attached to said support member, said loop making device having a mating slot on the end portion thereof, said loop making device comprised of in combination:
   a loop making slide slideably attached to said support member, said loop making slide having a loop making slot on the end portion thereof, adapted to mate with said mating slot.

6. The combination as claimed in claim 5 in which said loop making device has a line holding notch adjacent to said mating slot.

7. The combination as claimed in claim 6 in which said loop making slide has a band retaining post thereon adapted to be attached to said elastic band to bias said loop making slide towards said center section.

8. The combination as claimed in claim 7 having a pocket clip attached to said support body adapted to clip said hook tying device to a pocket.

9. The combination as claimed in claim 8 in which said hook clamping slide and said loop making slide having longitudinal openings in the center portion thereof adapted to permit longitudinal movement of said slides.

References Cited

UNITED STATES PATENTS 2,601,605    6/1952    Fulvio _____ 289—17
3,326,586    6/1967    Frost et al. _____ 289—17

LOUIS K. RIMRODT, Primary Examiner